(No Model.)

C. H. BRUNK.
GATE.

No. 551,487. Patented Dec. 17, 1895.

Witnesses:
Milton O'Connell
Edw. O. Duvall, Jr.

Inventor:
Christian H. Brunk
by Wm. Moore
Atty.

UNITED STATES PATENT OFFICE.

CHRISTIAN H. BRUNK, OF HARRISONBURG, VIRGINIA.

GATE.

SPECIFICATION forming part of Letters Patent No. 551,487, dated December 17, 1895.

Application filed February 15, 1895. Serial No. 538,512. (No model.)

*To all whom it may concern:*

Be it known that I, CHRISTIAN H. BRUNK, a citizen of the United States, residing at Harrisonburg, in the county of Rockingham and State of Virginia, have invented certain new and useful Improvements in Gates; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in gates; and the object of my invention is the provision of a gate constructed of iron and wire which will be light, strong and durable and which can be produced at a very low price, thus providing a practical and useful farm-gate.

To attain the desired object the invention consists of a gate embodying novel features of construction and combination of parts as substantially disclosed herein.

Figure 1:
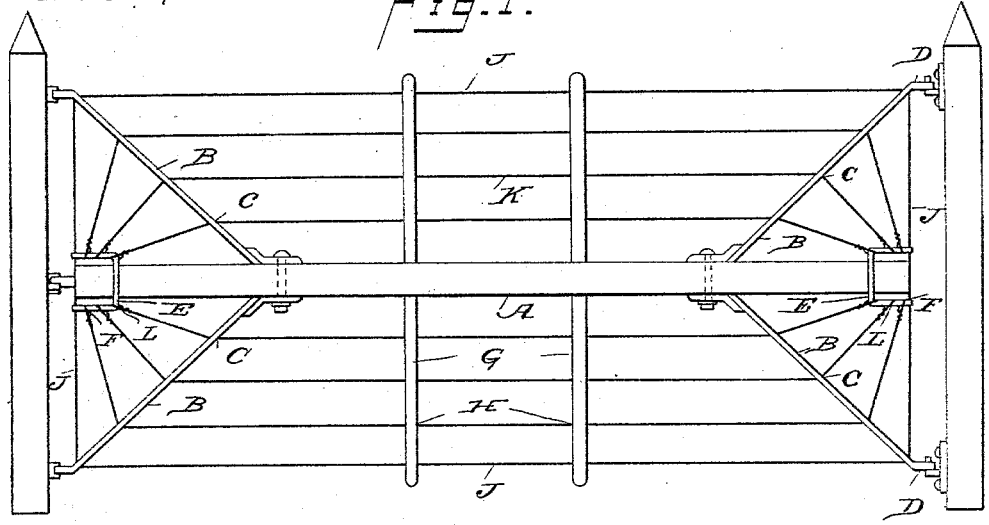
Figure 2:
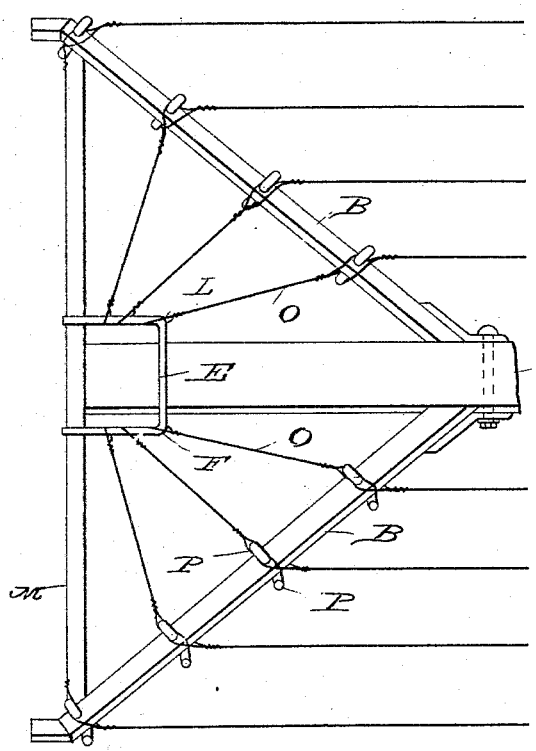
Figure 3:
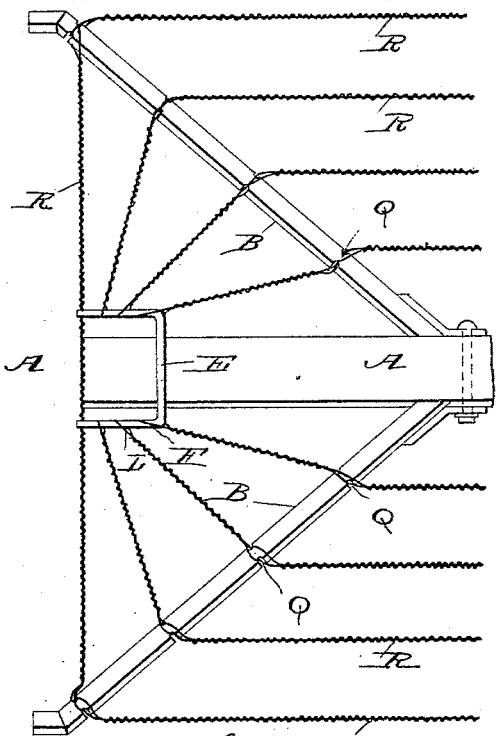

Figure 1 represents a side elevation of a gate embodying my invention in position for use, and Figs. 2 and 3 are side views of modifications.

In the drawings, A designates a longitudinal bar to which are connected near their ends the inclined arms B, which are formed with a series of openings C. Secured to the inclined arms at one end of the gate or formed integral with them are the hinges D, by means of which the gate is hung upon the post, and to each end of the main supporting-bar is secured a ferrule E, in the form of a bail or staple, and to the main supporting-bar are secured the bars G, having openings H. This structure forms what I term the "frame" of my gate and is made of metal, producing a frame which is light in weight, inexpensive and simple in construction, though very strong and durable and that cannot sag or warp.

Through the openings provided in the frame I pass the outer wire J and the series of inside wires K, being secured to the ferrule L and passing through the openings of the inclined arms and vertical bars, thus forming an ornamental fabric.

In the form of my gate shown in Fig. 2 I provide at the ends of the main supporting-bar vertical pieces or uprights M, and attached to the bar and pieces the loops, ferrules or bails E, to which are connected the ends of the fence-wires O, which pass from said ferrule to the inclined arms and are secured to the tug-pieces or double lugs P.

In the form of my gate illustrated in Fig. 3 I provide the inclined arms B with notches Q on their edges to receive the wires, and in order to give a more ornamental appearance to the gate as well as to render the same strong and more durable I use two or more strands of wire twisted or coiled into a rope R, and the manner of connecting is the same as in the other case.

I claim—

1. A gate consisting of the main supporting bar, the ferrules secured one to each end of said bar, the inclined arms near each end thereof, the vertical bars connected to the main bar, and the wires strung upon said bar, inclined arms, and posts, and having their ends fastened to the ferrules.

2. A gate consisting of the main supporting bar, the arms near each end of the bar provided with openings or tug pins, the ferrules or caps secured at the ends of the main bar, and the wires fastened to the ferrules and upon the arms.

3. A gate consisting of the main supporting bar, the ferrules or caps secured at the ends of said bar, the inclined arms extending out from the main bar and having tug pins or openings, the vertical bars uniting the arms with the center bar, and the wires secured to the ferrules and to the arms.

In testimony whereof I affix my signature in presence of two witnesses.

CHRISTIAN H. BRUNK.

Witnesses:
GEO. W. HESS,
JNO. L. LOGAN.